United States Patent [19]

Norton

[11] Patent Number: 4,915,411

[45] Date of Patent: Apr. 10, 1990

[54] CRASH SENSOR WITH IMPROVED ACTIVATION FOR STABBING PRIMER

[76] Inventor: Peter Norton, 1 S. Lakeside, Lake Hopatcong, N.J. 07849

[21] Appl. No.: 148,083

[22] Filed: Jan. 25, 1988

[51] Int. Cl.$^4$ .............................................. B60R 21/32
[52] U.S. Cl. ..................................... 280/734; 280/728
[58] Field of Search ................................ 280/734, 728; 200/61.53, 61.45 R, 61.45 M

[56] References Cited

U.S. PATENT DOCUMENTS

| | | | |
|---|---|---|---|
| 3,964,394 | 6/1976 | Wolf | 280/728 |
| 4,161,228 | 7/1979 | Svensson et al. | 280/734 |
| 4,573,706 | 3/1986 | Breed | 280/734 |

*Primary Examiner*—Kenneth R. Rice
*Attorney, Agent, or Firm*—Reising, Ethington, Barnard, Perry & Milton

[57] ABSTRACT

A crash sensor for automobiles of the type including a ball moving against viscous damping in a closed cylinder for releasing a firing pin for initiating a pyrotechnic sequence has an improved release mechanism. When the ball moves a predetermined distance from its normal or resting position during an automobile crash a release mechanism releases a belleville spring maintained under stress. The belleville spring thereupon initiates movement of a firing pin towards a stab primer. The release mechanism is a single piece of spring material having multiple levers extending radially inward from a torsionally elastic ring, each lever having a detent and a pivot. The firing pin is mounted on and driven by a snap disk which is normally in its position of higher energy equilibrium and is released to go to its position of lower energy equilibrium by pressure applied by the belleville spring.

13 Claims, 4 Drawing Sheets

CRASH SENSOR WITH IMPROVED ACTIVATION FOR STABBING PRIMER

FIELD OF THE INVENTION

This invention relates to mechanisms that release a firing pin upon frontal collision of automobiles for initiating deployment of air bags.

BACKGROUND OF THE INVENTION

Air bags are inflatable bags that remain folded and out of sight in readiness for a frontal collision. During a collision, chemical reaction of a material typically containing sodium azide produces gaseous products which inflate the bag and interpose it between the driver and the steering wheel or the front seat occupant and the dashboard.

A sensor of the type to which this invention is applicable is marketed by Breed Automotive Corp. It has a metallic ball free to move in a sealed cylinder. Air flow around the ball causes a pressure differential. The pressure differential causes a force proportional to and opposite the relative velocity of the ball with respect to the cylinder. The proportionality of force to velocity makes the sensor an acceleration integrator that initiates a chemical reaction upon achievement of a predetermined velocity change. The variation of air viscosity with temperature is compensated by making the cylinder and ball of materials of different thermal expansion coefficients thereby causing the gap between the ball and cylinder to change with temperature as required to maintain the performance of the sensor over a wide temperature range. A firing mechanism for initiating combustion of a stab primer includes a pin propelled by a first spring into the stab primer. A release means for the firing mechanism includes a trigger lever in the form of a metal rod extending perpendicular to a pivoted shaft having a "D" shaped cross section. The trigger lever is moved by the ball to its firing position during a crash. A second spring urges the trigger lever away from the firing position thereby causing the trigger lever to maintain the ball in a normal or resting position during normal operation of the vehicle. The force the trigger lever applies to the ball modifies the pure velocity change character of the sensor so that the velocity change required for release of the firing pin increases with the duration of the deceleration pulse of the crash. Movement of the ball during a crash rotates the trigger lever until the flat portion of the D-shaft releases the firing pin which is thereupon driven by the spring into a stab primer. Ignition of the stab primer initiates combustion of larger amounts of propellent material that generates gas for filling the air bag. Two complete sensor and firing mechanisms are combined into one package to enhance reliability by providing two units each capable of initiating combustion of the propellant.

This sensor is expensive to manufacture and one reason for the high cost is the large number of complex parts and the precision required in the trigger mechanism. Great care is required to make each part so as to insure minimum friction and maximum precision during the life of the sensor.

A belleville spring is a washer shaped piece of elastic material bent so that in its relaxed shape its inner circumference is in a plane offset from the plane of its outer circumference. Under pressure applied to its inner circumference the spring flattens and, under greater pressure, its inner circumference moves to the opposite side of the outer circumference. When released it returns to its initial relaxed shape. A belleville spring has two characteristics that are used to advantage in this invention. The first is that it can exhibit a negative spring rate over much of its operating range. In a typical case the spring force will rise from zero as the spring is deformed from its relaxed shape to a peak force at a first deflection and then, as the spring is additionally deformed, diminish to a minimum of perhaps one fifth of the peak force at a second deflection before resuming its increase. A second characteristic is that the inner and outer circumference of a belleville spring can be made to high accuracy. The high accuracy obtainable at acceptable cost allows a design to be dependent upon achieving high accuracy for purposes such as accurately determining the velocity at which the sensor will be actuated.

A snap disk resembles a belleville spring without the inner hole. A snap disk is a piece of spring material that has a normal relaxed shape approximating a section of a sphere. In this shape its potential energy is at its lowest value. It is also in equilibrium, or will also remain indefinitely in a second shape in which it is dished in the opposite direction. In its second shape it has greater potential energy than in its normal relaxed shape and will energetically snap into its relaxed position when it is urged in that direction by force applied to its center.

A general object of this invention is to provide a crash sensor for automotive vehicles which also overcomes certain disadvantages of the prior art.

SUMMARY OF THE INVENTION

The present invention provides a crash sensor of the type having a viscously damped ball movable in a sealed cylinder with trigger lever means to sense movement of the ball and initiate movement of a firing pin when the ball has reached a firing position. The invention discloses a system of the aforementioned type which is highly reliable, compact, light in weight, and economical to manufacture. The trigger mechanism is a novel design that minimizes the number of components and their manufacturing cost.

Further, in accordance with this invention, there is a spring having a negative spring rate and linked with the trigger lever for release thereby so the force of the spring at the position from which it is released is less than at other positions thereby maximizing the energy released relative to the friction force at the time of release.

Further, in accordance with this invention, all precision fitting of parts is done at surfaces having circular symmetry thereby achieving high precision using inexpensive production methods.

Further, in accordance with this invention, the axial symmetry of the sensor and its components simplifies the manufacture because many of the components do not require rotational orientation during assembly.

Further, in accordance with this invention, the force of the spring before it is released by the trigger urges the trigger lever and ball towards their normal resting positions thereby eliminating need for a second spring to return the trigger lever and ball.

Further, in accordance with this invention, the entire sensor and stabbing mechanism is a self contained unit having structural integrity. By contrast, known mechanical crash sensing and primer stabbing systems rely on the structure supporting the stab primer for structural integrity. Therefore, the two sensor and primer stabbing systems of the known system must be manufactured and assembled at the same time as each other and at the same time as the entire sensor. This has the disadvantage that the if there is an error or defect in manufacturing one of the two crash sensing and primer stabbing systems there is a higher than random probability that the same cause will affect the other of the two units. Two units of the design disclosed herein can be chosen from independently manufactured lots and combined in the same occupant protection system whereby the probability of system failure is reduced to a greater extent than if both units are manufactured simultaneously.

A complete understanding of this invention may be obtained from the description that follows taken with the accompanying drawings.

DESCRIPTION OF THE DRAWINGS

FIG. 5 shows two sensors of the invention in an inflator and also shows certain parts of the inflator.

BEST MODE FOR CARRYING OUT THE INVENTION

Figure 1:
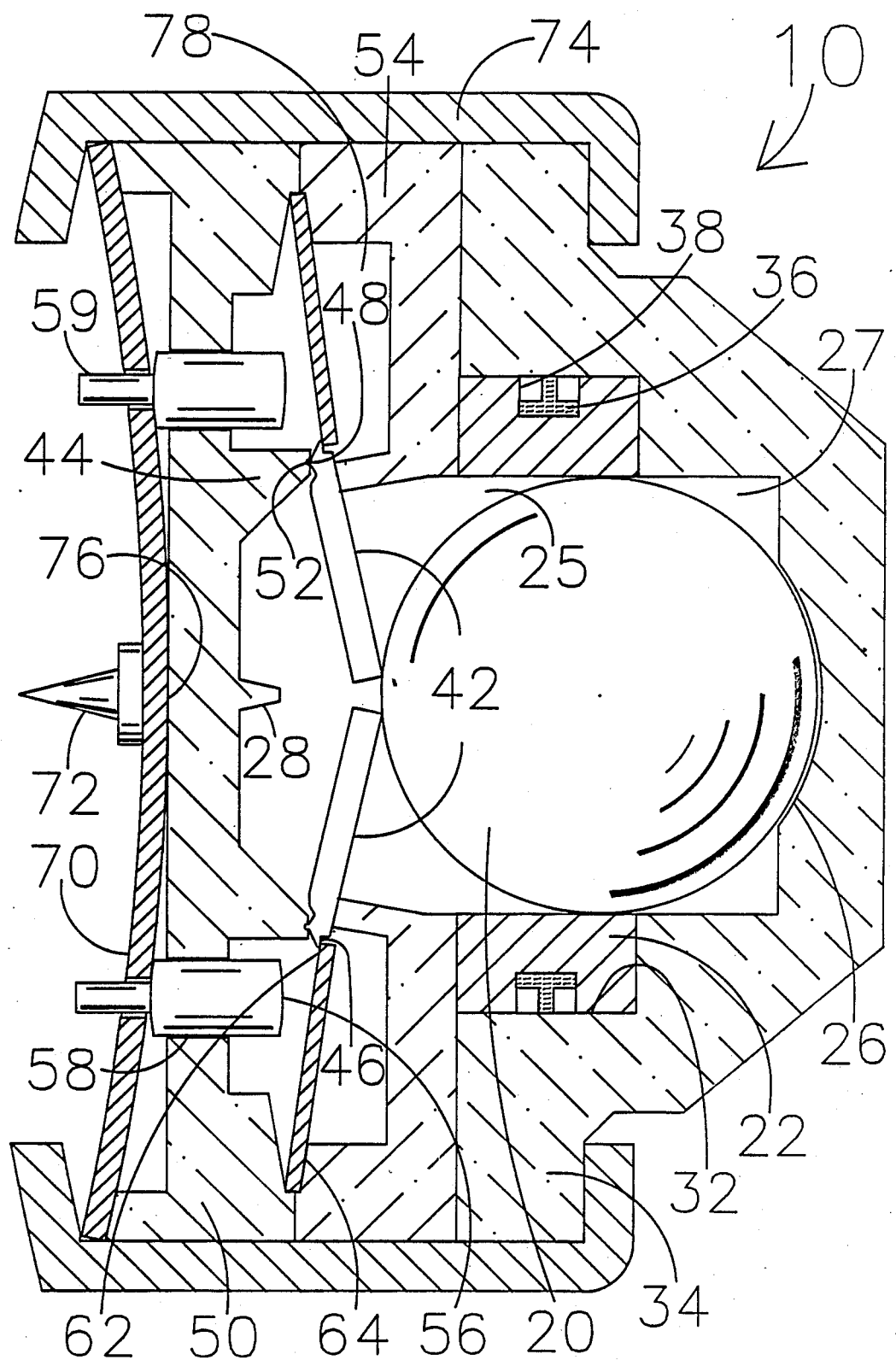
FIG. 1 shows a complete sensor of the invention with certain parts shown in section and the ball in its normal or resting position.
Figure 2:
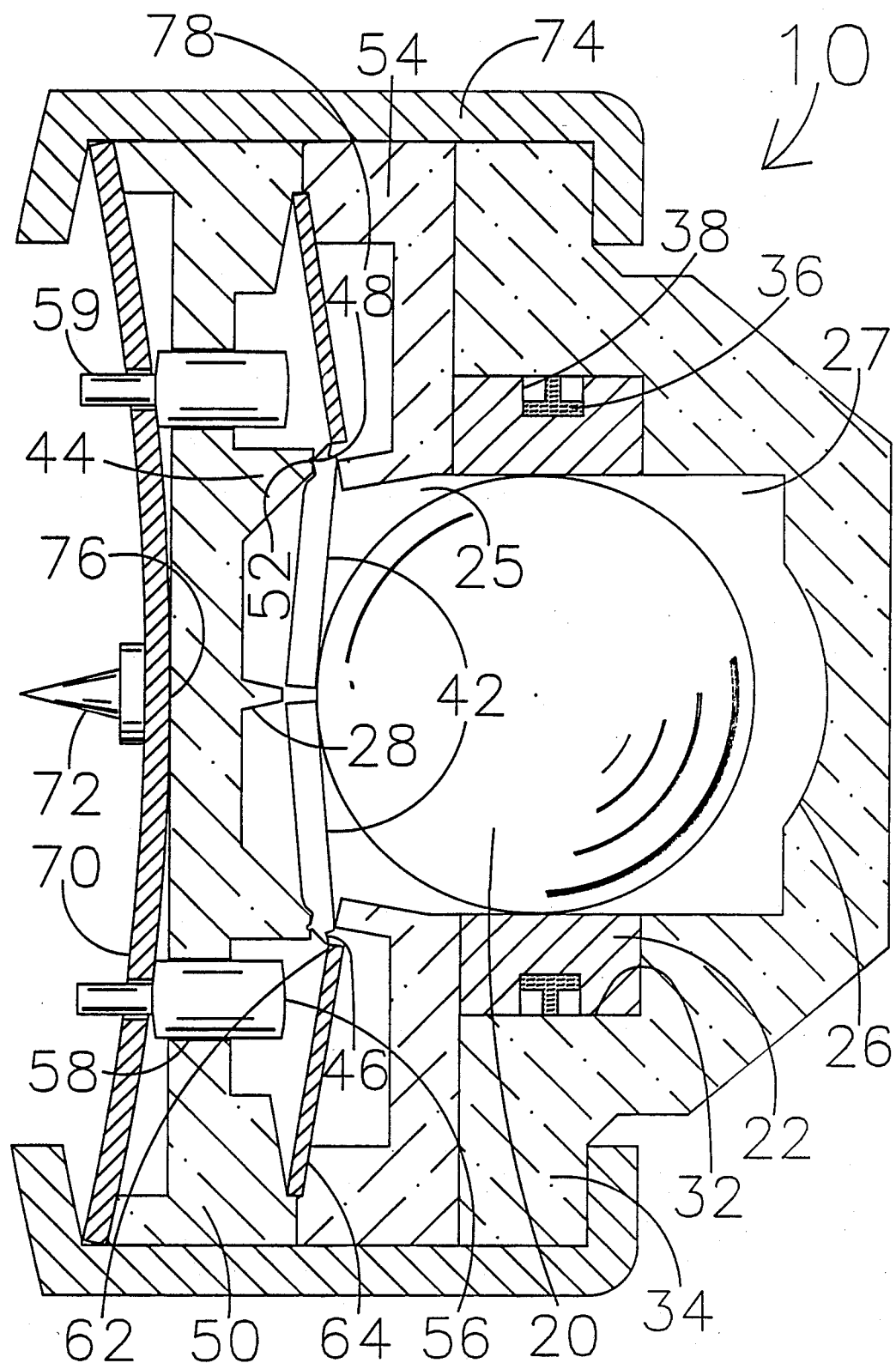
FIG. 2 shows the sensor as illustrated in FIG. 1 but with the ball in its firing position just prior to releasing the belleville spring for initiating movement of the firing pin.

Referring now to the drawings, an illustrative embodiment of the invention is shown in a crash sensor 10. The crash sensor comprises a ball in a sealed cylinder for sensing a deceleration pulse indicative of a crash. During a crash the ball moves trigger levers to a position where a firing mechanism is released. A firing pin is adapted for piercing a stab primer (not illustrated) for initiating a chemical reaction that generates gas that causes deployment of an air bag. It will be appreciated as the description proceeds that the invention may be implemented in different embodiments.

Referring now to FIGS. 1 through 4, the crash sensor 10 comprises a ball 20 movable in cylinder 22 between stops 26 and 28.

Cylinder 22 fits loosely in cavity 32 in cylinder housing 34. Sealing ring 36 in groove 38 of cylinder 22 prevents movement of air around cylinder 22 while allowing cylinder 22 to move slightly within cavity 32.

Trigger levers 42 extend inwardly from support ridge 44 of foundation 50 to ball 20. At their outward extremity trigger levers 42 have triangular pawls 46 for engaging the inner edge 62 of belleville spring 64. Each trigger lever 42 has a pivot 48 which fits in a mating groove 52 in support ridge 44 and positions trigger lever assembly 40 (illustrated in FIG. 4) with respect to support ridge 44. Collar 54 retains trigger lever assembly 40 and belleville spring 64 on foundation 50.

Rods 56 are slideably positioned in holes 58 in foundation 50. Snap disk 70 is positioned for energetically snapping between the position illustrated in FIG. 1 and the position illustrated in FIG. 3 when urged by rods 56. Firing pin 72 is attached to the center of snap disk 70.

The entire assembly is held together by outer cylindrical housing 74. During normal operation of the vehicle any play that might exist between cylinder housing 34, collar 54 and foundation 50 is taken up by movement resulting from the force applied by center 76 of snap disk 70 to foundation 50. Extensions 59 of rods 56 extend through holes in snap disk 70 and provide means for applying pressure through rods 56 to belleville spring 64 for setting the sensor to its armed state.

No counterbalance for trigger levers 42 has been described or illustrated. This is because it is believed that the best design is to not counterbalance the levers. If it should be required to counterbalance the levers to reduce sensitivity to shock then counterbalance weights may be added to trigger levers 42 by extending trigger levers 42 outward into cavity 78 defined by belleville spring 64 and collar 54.

Figure 4:
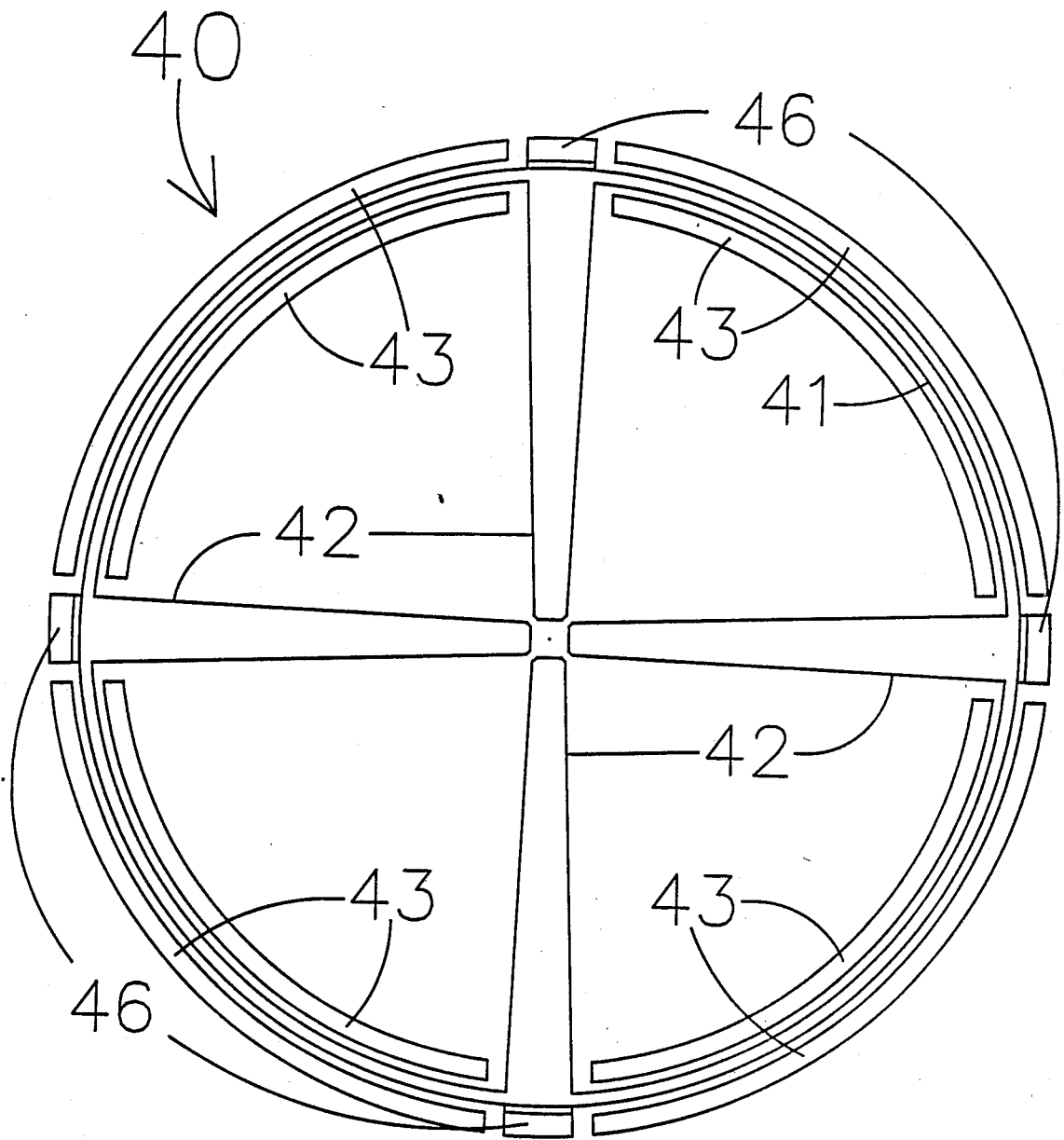
FIG. 4 shows a top view of the trigger levers and unitary torsionally elastic ring.

Trigger lever assembly 40 is illustrated in FIG. 4. It comprises trigger levers 42 connected by torsionally elastic ring 41 at the radius of and incorporating pivots 48. It is a unitary structure formed from a sheet of spring material. In its relaxed condition the trigger levers 42 and ring 41 are coplanar. The orientation of the trigger levers 42 illustrated in FIG. 1 is the result of force applied by belleville spring 64. In some embodiments of the invention it may be desirable to provide walls 43 which are extensions of support ridge 44 which form channels confining ring 41. Walls 43 limit the radial movement of ring 41 at all points on its circumference other than at the trigger levers 42.

Four trigger levers 42 are illustrated in FIG. 4. Any other number of trigger levers may also be used.

Referring now to FIG. 5, the crash sensors 10 and 10' are illustrated in an inflator housing 120. Crash sensor 10 is illustrated partially cut away. Crash sensors 10 and 10' are preferably made under different circumstances such as of different lots of materials and at different times or on different assembly lines to minimize the probability of both sensors having the same production defect. Stab primers 122 and 124 are located where they will be pierced by sensors 10 and 10' respectively in the event of a car crash. The stab primers 122 and 124 are also preferably made under different circumstances to minimize the probability of both having the same production defect. The stab primers 122 and 124 are located adjacent ignition material 126 for igniting it and the ignition material is designed to assure ignition even if only one of the stab primers operates. The ignition material is typically a mixture of boron metal and potassium nitrate. Granules and other forms of ignition material are commercially available. The propellent 128 is adapted to be ignited by the ignition material 126 and burn to produce gas for inflating an air bag.

The operation of the invention will now be described with reference to FIGS. 1 through 4.

In operation of the system, ball 20 is normally urged against stop 26 by the trigger levers 42. When a deceleration much greater than one g is applied to the sensor, as would happen during an automobile crash, the inertia of the ball 20 causes it to move away from the stop 26 and toward stop 28. For this movement to happen it is necessary for some of the air in chamber 25 to pass through the annular gap between ball 20 and cylinder 22 into the chamber 27. The movement of the air between the ball and cylinder is resisted by the viscosity of the air thereby causing a pressure differential with the pressure in chamber 25 being greater than the pressure in chamber 27. This pressure differential opposes the movement of ball 20 toward stop 28 so that a predetermined movement required to initiate movement of the firing pin 72 is not achieved until a predetermined velocity change has occurred.

At lower ambient temperatures the clearance between ball 20 and cylinder 22 decreases because the thermal coefficient of expansion of the cylinder 22 is greater than that of the ball 20. This increases the viscous resistance to the movement of air through the annular gap and compensates for the reduced viscosity of air at lower temperatures. At higher temperatures the clearance increases thereby also compensating for the higher viscosity of air at higher temperatures. The diameters of the ball and cylinder bore are chosen so that the temperature compensation is correct for the materials of which the ball and cylinder are made.

As the ball 20 moves toward stop 28 trigger levers 42 rotate about their respective pivots 48. As triangular pawls 46 rotate their outer ends move upward and inward. This additionally stresses belleville spring 64. This continues until triangular pawls 46 move inward to a release position illustrated in FIG. 2 where their outer extremities align with the inner diameter of belleville spring 64. Ideally, the release position is where the force of belleville spring 64 is near its minimum both because it is desirable to minimize friction force at the point of release and because it is desirable for the force applied by trigger levers 42 to ball 20 to diminish as the ball travels farther from its normal resting position. When the pawls 46 have moved to the positions where their outer extremities are in alignment with the inner diameter of belleville spring 64, the belleville spring 64 is no longer supported and it snaps toward its relaxed position.

As belleville spring 64 moves toward its relaxed position it encounters rods 56. By this time the force it is capable of applying has increased by a substantial factor, such as five, since its release and this force combined with the force resulting from the inertia of belleville spring 64 is applied through rods 56 to snap disk 70. This force starts the snap disk in its movement toward its relaxed position illustrated in FIG. 3. As snap disk 70 and firing pin 72 move, belleville spring 64 continues to apply force through rods 56 thereby further adding energy to enhance the penetration of the stab primer (illustrated in FIG. 5) by firing pin 72.

Figure 3:
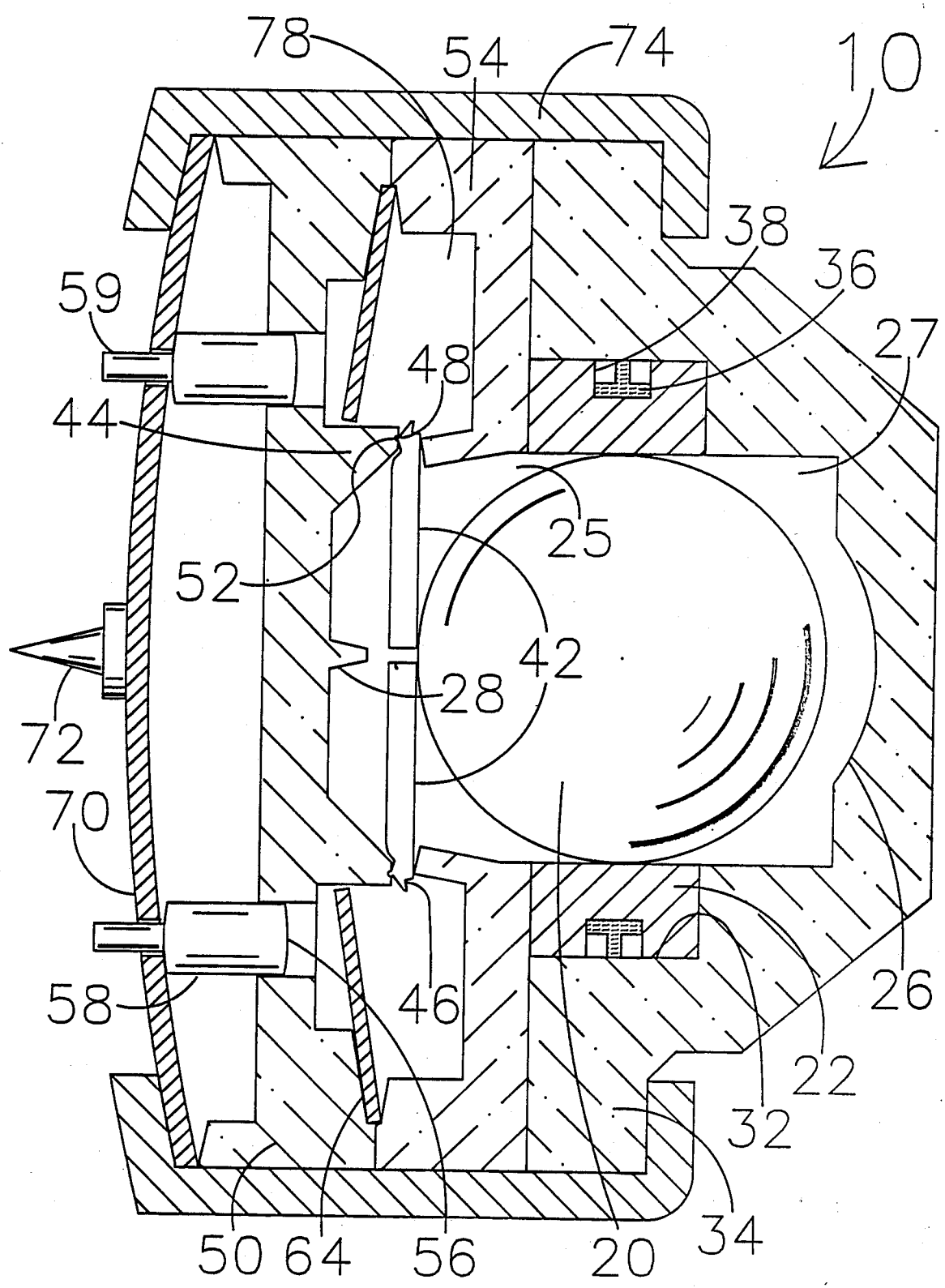
FIG. 3 shows the sensor as illustrated in FIG. 1 but with the trigger levers and ball in their relaxed positions and the movement of the belleville spring and firing pin complete.

When the crash sensor 10 is in the unarmed state illustrated in FIG. 3 it is armed by applying force to the extensions 59 of rods 56 while urging snap disk 70 into its position of higher energy equilibrium. As belleville spring 64 is bent toward the armed position illustrated in FIG. 1 it contacts triangular pawls 46 of trigger levers 42 and moves them to the right or toward cylinder 22 and inward toward the center of the sensor. This causes trigger levers 42 to rotate about pivots 48 until the outer extremities of trigger levers 42 are aligned with the inner diameter of belleville spring 64. The triangular pawls will then slip past belleville spring 64 and trigger lever assembly 40 will revert to its relaxed planar condition. Extensions 59 of pins 56 are then released to cause the inner edge 62 of belleville spring 64 to engage pawls 46 and urge them into the position illustrated in FIG. 1.

A mechanism for preventing accidental firing when the system is not installed in a vehicle is normally included in complete systems of the type that would includes sensors 10. Sensor 10 can be made safe against accidental firing by incorporating a means in the complete system for holding pins 56 against belleville spring 64 at those times that the system is not installed in a vehicle.

The operation of the invention will now be described with reference to FIG. 5. Upon sensing a crash either of the crash sensors 10 or 10' pierces the corresponding stab primer 122 or 124. Upon being pierced the stab primers 122 and 124 eject a jet of hot material into the ignition material 126 which ignites the ignition material. The hot jet from either of the stab primers is sufficient to ignite the ignition material. The burning ignition material produces a mixture of very hot gasses and burning particles which go through passages in the inflator housing 120 (not illustrated) to the propellant 128 and ignite it. The propellant burns to produce gas for inflating an air bag.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a crash sensor of the type comprising a first resilient means for storing energy, an element movable in response to deceleration forces during a crash, and release means adapted to release the energy stored in said first resilient means upon movement of said element to a predetermined position, the improvement comprising:

said release means coacting with said first resilient means for constraining it in a stressed state for storing energy, and said first resilient means having a negative spring rate for some range of stored energy.

2. The invention as defined by claim 1 wherein said movable element is a ball movable in a cylinder.

3. The invention as defined by claim 1 wherein said first resilient means is a belleville spring.

4. The invention as defined by claim 1 including a second resilient means for storing energy and means linking said second resilient means with said first resilient means for releasing energy stored in said second resilient means upon release of said energy stored in said first resilient means.

5. The invention as defined by claim 4 wherein said second resilient means comprises a snap disk.

6. In a crash sensor of the type comprising a first resilient means for storing energy, an element movable in response to deceleration forces during a crash, and release means adapted to release the energy stored in said first resilient means upon movement of said element to a predetermined position, the improvement comprising:

said release means coacting with said first resilient means for constraining it in a stressed state for storing energy, and said release means comprising a ring having plural trigger levers extending inward.

7. The invention as defined by claim 6 wherein said ring and said trigger levers are made of a single piece of material.

8. The invention as defined by claim 6 wherein there is a foundation supporting said ring and said foundation comprises an annular groove adapted to support said ring and to retain said ring in a precisely determined position.

9. The invention as defined by claim 8 wherein said groove is also linked with said trigger levers and positions said trigger levers for rotation about said groove.

10. In a crash sensor of the type comprising a first resilient means for storing energy, an element movable in response to deceleration forces during a crash, and release means adapted to release the energy stored in said first resilient means upon movement of said element to a predetermined position, the improvement comprising:
    said release means comprising trigger means linked with said first resilient means for movement therewith and wherein,
    said trigger means urges said movable element away from said predetermined position by using energy stored in said first resilient means.

11. The invention as defined by claim 1 wherein two or more independently manufactured sensors are placed within one airbag system, and wherein each of said sensors has its own stab primer and each of said stab primers is by itself capable of initiating deployment of the air bag, whereby the probability of the system failing to operate in the event of a crash requiring an air bag is reduced.

12. In an occupant protection system of an automotive vehicle of the type comprising multiple crash sensors located near each other and each adapted to pierce a stab primer and initiate a chemical reaction in response to deceleration forces during a crash, the improvement comprising:
    each of said crash sensors being a unitary structure adapted to be placed in an occupant protection system,
    said crash sensors being grouped in manufactured which have one or more manufacturing circumstances in common,
    each sensor of said multiple crash sensors being drawn from a different one of said groups.

13. The invention as defined by claim 12 wherein said different groups from which said multiple crash sensors are drawn are selected to maximize the differences in the manufacturing circumstances.

* * * * *